Patented Dec. 2, 1941

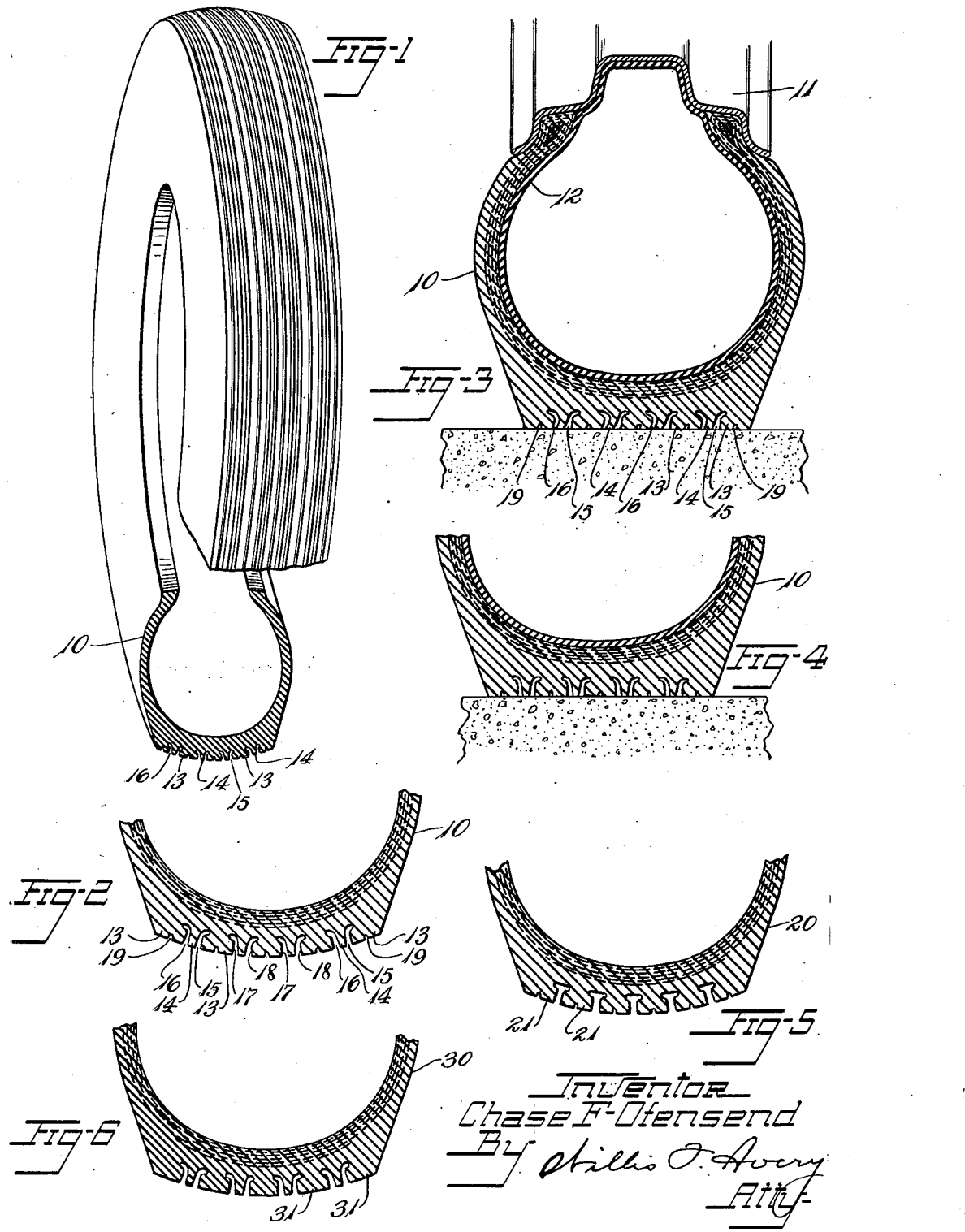

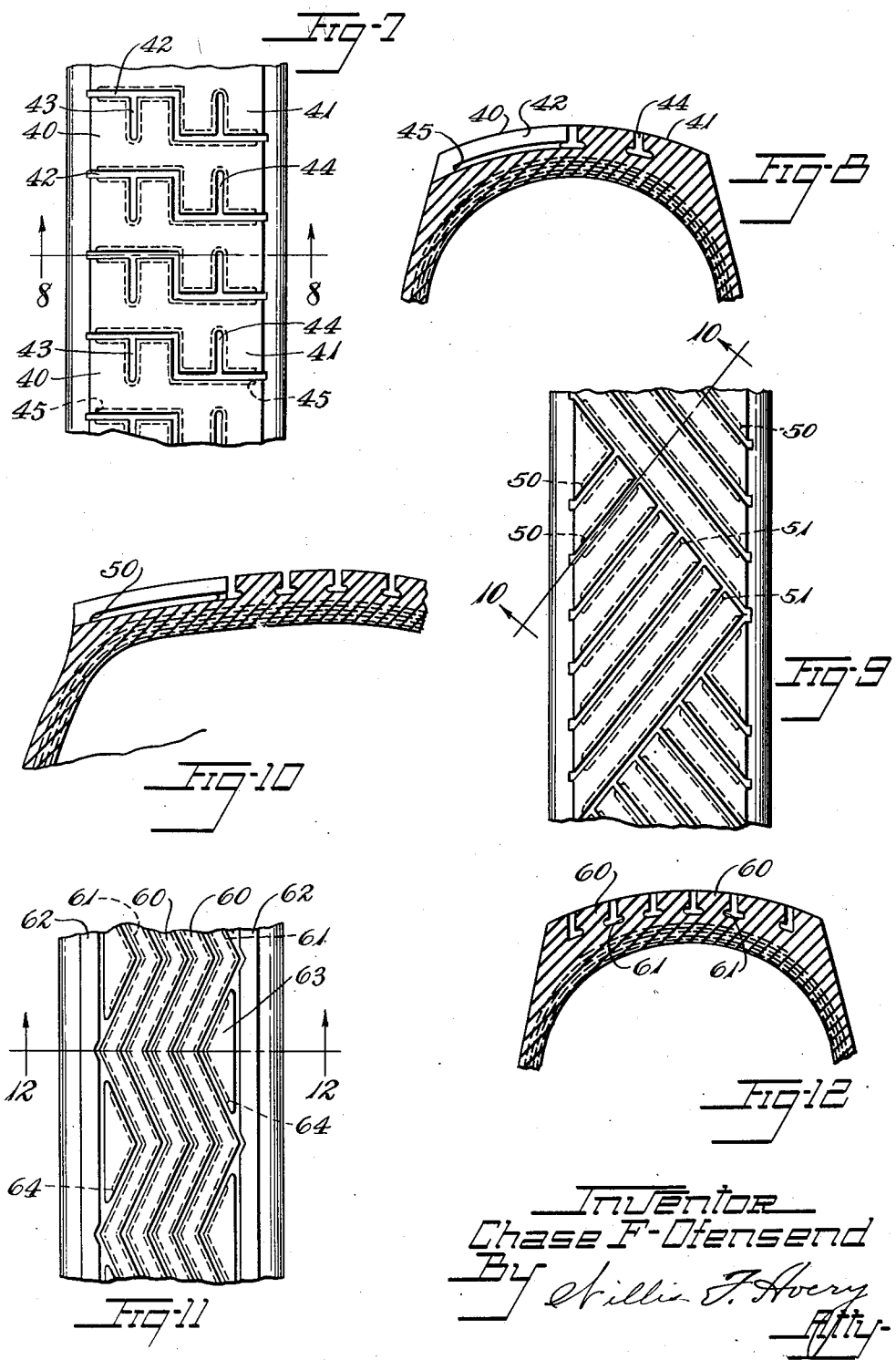

2,264,767

UNITED STATES PATENT OFFICE 2,264,767

TIRE TREAD

Chase F. Ofensend, Akron, Ohio, assignor to The B. F. Goodrich Company, New York, N. Y., a corporation of New York Application August 23, 1939, Serial No. 291,531

6 Claims. (Cl. 152—209)

This invention relates to tire treads, and especially to the treads of pneumatic tires.

It has been proposed heretofore to provide a tread composed of circumferentially extending ribs relatively narrow as compared to their depth so that the resistance to slippage is increased by the tilting of the ribs under the forces on the tire tread tending to cause such slippage. However, owing to the great instability thus provided, control and ease of steering have been objectionably reduced. Upon increasing the widths of such ribs the stability has been increased, but with an accompanying loss of resistance to slippage. Wider, sturdy ribs are desirable for good load support and even wear, but such ribs heretofore have been low in resistance to slippage.

The chief objects of this invention are to provide for overcoming disadvantages in the prior constructions, to provide for an adequate degree of instability of the tread elements for effecting a high degree of resistance to slippage and at the same time to provide tread elements having substantial bodies and broad faces for ground contact and load support, to provide improved cushioning by the tread for increased riding comfort, and to provide related desirable characteristics in the tire tread including quietness of operation, long and even wear, and attractiveness of appearance.

These and further objects will be apparent from the following description reference being had to the accompanying drawings, in which:

Fig. 1 is a perspective view of a tire constructed according to and embodying the invention, parts being broken away and sectioned.

Fig. 2 is a cross section on an enlarged scale of the tread of the tire of Fig. 1.

Fig. 3 is a cross section of the tire of Fig. 1 inflated upon a rim, the tire being in load-supporting condition upon a pavement with a force upon the tire tending to cause slippage, the tread elements being tilted under such force to increase the resistance to such slippage.

Fig. 4 is a view like Fig. 2 but showing the tire in load-supporting condition upon the pavement, without such force upon the tire.

Figs. 5 and 6 are views like Fig. 2 but showing, respectively, modified constructions.

Fig. 7 is a plan view, with parts broken away, of a further modified tread construction.

Fig. 8 is a section taken along the line 8—8 of Fig. 7.

Fig. 9 is a view like Fig. 7, but showing a still further modified tread construction.

Fig. 10 is a section taken along the line 10—10 of Fig. 9.

Fig. 11 is a view like Fig. 7, but showing a further modified tread construction.

Fig. 12 is a section taken along the line 12—12 of Fig. 11.

In the attainment of the objects of the invention in the embodiment of Figs. 1 to 4, I provide a tire tread comprising a plurality of circumferentially extending ribs, each wide throughout a considerable portion of its depth for maintaining a face of substantial width throughout an extensive period of wear and a body of the rib of considerable mass for supporting and transmitting loads, in which tread at least some of the grooves separating the ribs extend in undercut relation into the sides of the ribs well below the faces of the latter. This construction has the advantage that effective load-transmitting bodies of the tread material are provided in each rib with wide ground contacting faces that remain wide throughout extensive wear, so that, under normal conditions and under slight accelerative and de-accelerative and side stresses on the tire, the tread has a high degree of stability and resistance to wear, and under greater forces tending to cause slippage of the tire on the pavement, they are sufficiently unstable by virtue of the undercut construction to permit tilting to a degree sufficient for more effective action of the ribs to resist such slippage.

Also, this undercut construction greatly increases the cushioning qualities of the tread and tire and makes it possible to maintain higher inflation pressure in the tire while maintaining a comfortable softness of ride.

The tire 10 of Figs. 1 and 4, which may be mounted upon a rim 11 and inflated by means of the usual inner tube 12, comprises a tread portion of rubber composition or other suitable tread material divided by grooves into a plurality of circumferentially extending ribs. These ribs comprise a plurality of major ribs 13, 13, each of considerable width, and intervening minor ribs 14, 14 which are relatively narrow. Grooves 15, 15 and 16, 16 separate the major and minor ribs, and these grooves are of such cross sectional shape as to provide walls 17, 17 and 18, 18 for the major ribs that extend substantially radially into the tread for a considerable distance to provide the desired mass of the rib and a uniform width for a substantial depth so that as the tread wears down its characteristics will remain substantially the same for an extensive period.

At the bottoms of the walls 17, 17 and 18, 18 the grooves extend in undercut relation into the sidewalls of the major ribs 13, 13 so that upon the application of sufficient force to the tire the major ribs will tilt about their regions at the undercut portions at the bottoms of the grooves, as is shown most clearly in Fig. 3. The major ribs 13, 13 preferably are of somewhat greater width than depth and the intervening minor ribs 14, 14 preferably are of less width than depth so as to be quite flexible. Upon distortion such as by the application of a force on a tire exerted from the left as viewed in Fig. 3, the minor ribs 14, 14 tilt quite easily to increase resistance to slippage through augmenting of their edge-action, while at the same time the major ribs 13, 13 offer more resistance to tilting but nevertheless are sufficiently unstable as a result of the undercut construction to provide effective edge-action for resisting slippage. Thus, the tire tread is at once desirably stable under normal conditions and at the same time has the somewhat anomalous characteristic of being effective to resist slippage under strong forces tending to cause such slippage. Preferably the major ribs have relatively shallow circumferentially extending grooves 19, 19 in their faces to reduce further the stiffness of the masses of tread material in these ribs.

While it is preferred to proportion the dimensions of the ribs and grooves approximately as shown in the drawings, variations may be made in the degree of undercutting and in the dimensions of the ribs and grooves over a considerable range according to the amount of stability or instability desired, the construction making it possible to combine load-supporting stability with slippage-resisting instability in various degrees, as desired.

Other variations may also be made. For example, in the tire 20 of Fig. 5 the minor highly flexible ribs may be omitted entirely leaving only major ribs 21, 21, the construction being the same as in Figs. 1 to 4 except for the omission of the minor ribs. In the tire 30 of Fig. 6 the construction is the same as that of Figs. 1 to 4 except that the minor grooves 19, 19 are omitted, thus increasing somewhat the stiffness of the major ribs indicated at 31, 31.

Features of the invention are applicable also to tread elements of forms other than the straight circumferential ribs. For example, in Figs. 7 and 8 the invention is applied to ribs extending predominantly across the tread at right angles thereto. In order to provide edges also in the longitudinal direction, to increase the effectiveness of a tread in resistance of side slippage, each rib may be formed with a jog centrally of the tread to provide the rib portions 40, 40 at one side of the tread and 41, 41 at the other side of the tread offset and interconnected as shown in Fig. 7, the tread elements being separated by jogged transverse grooves 42, 42. The tread elements may be further broken by short longitudinal extending grooves 43, 43 and 44, 44. The dotted lines in Fig. 7 indicate the preferred extent of undercutting to reduce the stability of the ribs under forces tending to cause tilting thereof.

Where the grooves are extended to the side edges of the tread to facilitate drainage it is desirable in some cases that the ribs at side margins of the tread be reinforced so that uneven wear will not result at such free margins. To this end, according to the invention, the undercut portion of the groove may be terminated short of the tread margins as is shown by the dotted lines in Fig. 7 and at 45 in Fig. 8. In this matter, the ends of the ribs at the tread margins have greater stiffness, while the central portions of the ribs possess the characteristic of reduced stability under tilting stresses.

The invention may be applied also to a tread having long reaches of diagonally disposed ribs, for example as is shown in Figs. 9 and 10. Here, it is desirable to terminate the undercut portion of the groove short of the tread margin as at 50, 50, and also to terminate such undercut portion short of the ends of the bars that terminate the portions of the ribs intermediate the tread as at 51, 51 in order that the end portions of the ribs may maintain an adequate degree of stability, while at the same time the intermediate portions of the ribs have the desired instability under tilting forces.

With reference to Fig. 11 and Fig. 12, the invention is applicable also to treads in which the ribs are continuous in a zig-zag or sinuous fashion as shown 60, 60. Each rib may be undercut in accordance with the invention as is indicated by the continuous dotted lines 61, 61. Circumferentially continuous marginal ribs 62, 62 may be provided and between these ribs the sinuous ribs triangular blocks 63, 63, may be inserted. While the undercut feature hereinabove described may be incorporated in all the ribs, for the purpose of increasing stiffness at the tread margins, the undercutting may be omitted in the marginal ribs 62, 62 and in the adjacent side of the blocks 63, 63. Both sides of all the sinuous ribs 60, 60, preferably are undercut, as is also the adjacent sides of the blocks 63, 63, the undercuts terminating at 64 as indicated by the broken lines in Fig. 11.

Variations may be made without departing from the scope of the invention as it is defined in the following claims.

I claim:

1. A tire having a tread comprising a plurality of ribs extending circumferentially of the tire, said ribs being separated by grooves at least some of which extend in undercut relation into the sides of the ribs to provide lesser widths of such ribs below the faces thereof than at their faces, whereby the stability of such ribs against lateral tilting is reduced by virtue of the undercut construction, and other ribs disposed between the first said ribs, said other ribs being narrow in relation to their depths and being of a width at their bases at least as great as at their tread faces.

2. A tire having a tread comprising a plurality of ribs in the face thereof, said tread having grooves at least some of which extend in undercut relation into the sides of the ribs to provide lesser width of such ribs below the faces thereof than at their faces, and other ribs alternating with the first said ribs, said other ribs being narrow in relation to their depths and being of a width at their bases at least as great as at their tread faces.

3. A tire having a tread comprising a plurality of ribs extending circumferentially of the tire, said tread having grooves at least some of which extend in undercut relation into the sides of said ribs considerably below the faces thereof to provide lesser width of such ribs at the undercut portion than at their faces and substantial bodies of the ribs between their faces and their undercut portions, whereby the ribs are stable under steady load and the stability of such ribs against lateral tilting is reduced by virtue of the undercut construction, and other ribs relatively narrow in relation to their depths interposed between the first said ribs and being of a width at their bases at least as great as at their tread faces, the first said ribs having relatively shallow grooves in the faces thereof.

4. A tire having a tread of rubber-like material comprising a plurality of ribs in the face thereof, which ribs are separated by grooves, a relatively narrow rib being interposed between adjacent wider ribs, and a groove which separates the narrow rib from an adjacent wider rib extending into such wider rib at its base in an undercut manner for providing lesser width of such wider rib at the undercut base than at the tread face of the rib, and said narrow rib being of a width at its base at least as great as at its tread face.

5. A tire having a tread of rubber-like material comprising a plurality of ribs extending circumferentially of the tire and separated by circumferentially extending grooves, a relatively narrow rib being interposed between adjacent wider ribs, and a groove which separates the narrow rib from an adjacent wider rib extending into such wider rib at its base in an undercut manner for providing lesser width of such wider rib at the undercut base than at the tread face of the rib, and the adjacent wall of the narrow rib at its base being rounded to provide greater width of such narrow rib at its base than at its tread face.

6. A tire having a tread of rubber-like material comprising a plurality of ribs extending circumferentially of the tire and separated by circumferentially extending grooves, a relatively narrow rib being interposed between adjacent wider ribs, and the grooves which separate the narrow rib from the adjacent wider ribs extending into such wider ribs at their bases in an undercut manner for providing lesser width of such wider ribs at their undercut bases than at the tread faces of the ribs, and said narrow rib being of a width at its base at least as great as at its tread face.

CHASE F. OFENSEND.